Sept. 20, 1966     R. SPIELMAN ET AL     3,274,465
TWO-POSITION TRIMMER CAPACITOR
Filed May 25, 1965     2 Sheets-Sheet 1
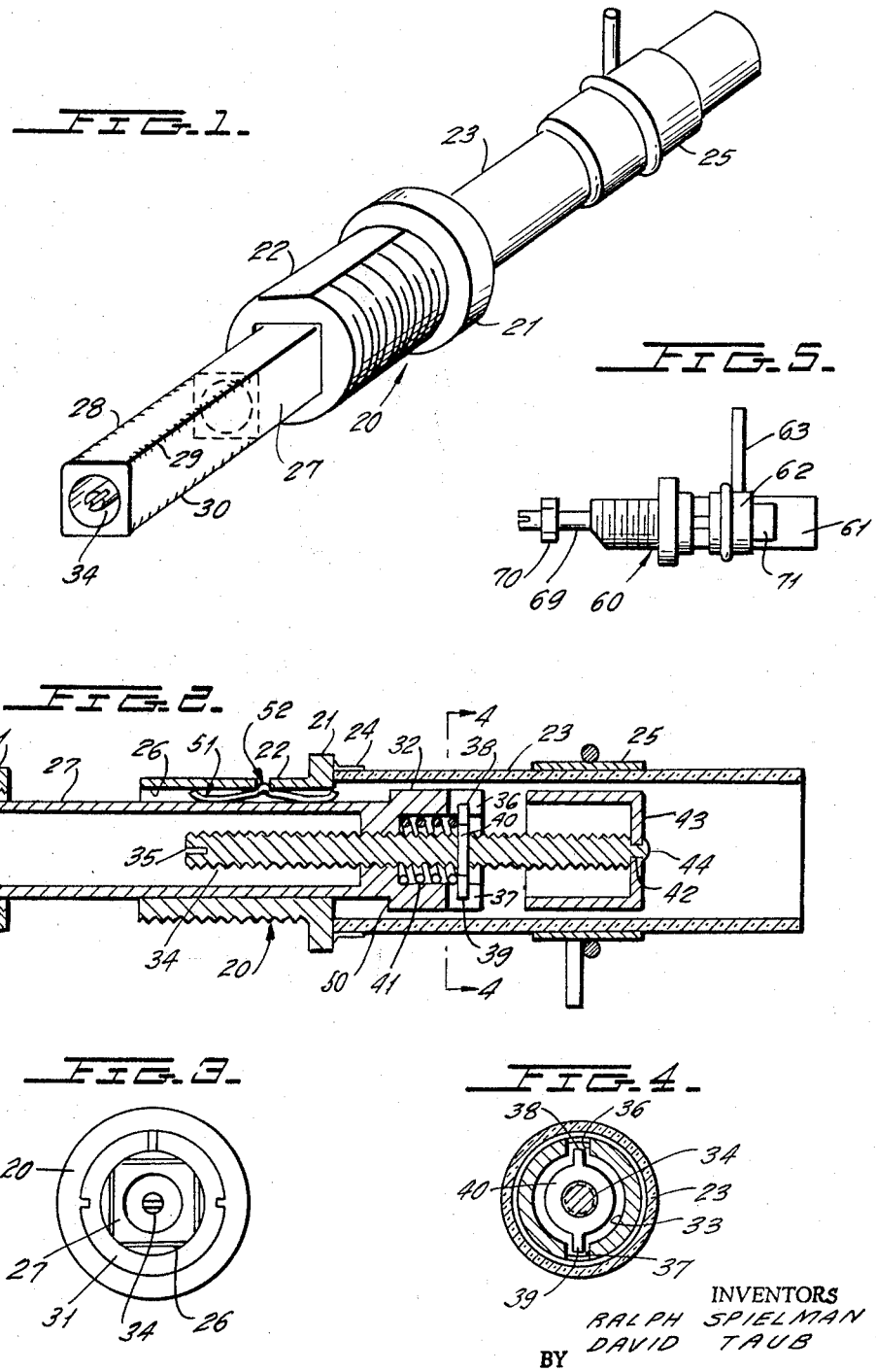
INVENTORS
RALPH SPIELMAN
DAVID TAUB
BY
OSTROLENK, FABER, GERB & SOFFEN
ATTORNEYS

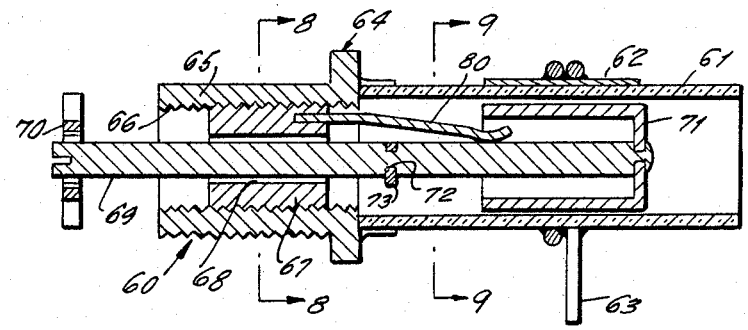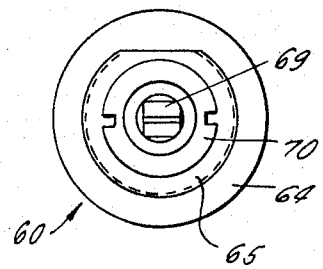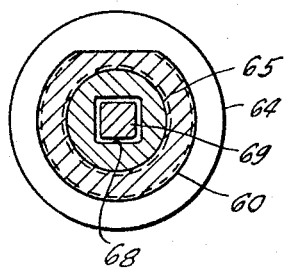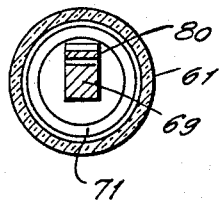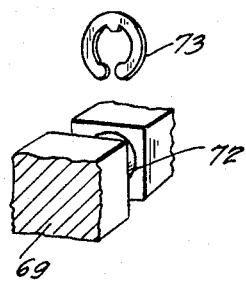

United States Patent Office 3,274,465
Patented Sept. 20, 1966

3,274,465
TWO-POSITION TRIMMER CAPACITOR
Ralph Spielman, Brooklyn, N.Y., and David Taub, Paris, France, assignors to JFD Electronics Corporation, Brooklyn, N.Y., a corporation of New York
Filed May 25, 1965, Ser. No. 458,690
5 Claims. (Cl. 317—249)

This invention relates to trimmer capacitors, and more specifically relates to a trimmer capacitor which is adjustably positioned between two accurately located capacitance values.

It is often desirable to provide a tuning-type device such as a capacitor which can be immediately operated between a first accurately adjusted value and a second accurately adjusted value. By way of example, in military radio equipment, tuning may be effected by means of a trimmer capacitor which is accurately adjusted to tune in a particular transmission frequency. In the event of jamming of this frequency, it is desirable to immediately move to an alternate carrier channel without having to wait for the time-consuming process of accurately adjusting a tuning capacitor to that value. In general, where trimmer capacitors are used for this purpose, their high accuracy requires that the adjustment of the capacitance value over a relatively large range be a relative time-consuming process. That is, the threaded adjustment screw is a finely threaded member.

Moreover, the fine adjustment of the circuit for best reception is also often a time-consuming process.

The principle of the present invention is to provide a novel trimmer capacitor structure which can be rapidly moved from a first accurately pre-adjusted position to a second accurately pre-adjusted position by the simple operation of moving a plunger.

More particularly, and in accordance with the invention, the piston assembly commonly used for trimmer capacitors is slidably mounted in a support bushing, whereupon the movable subassembly including the piston and its trimming adjustment mechanism can be accurately and quickly moved between a first stop position and a second stop position. The first stop position of the device can be that position where the piston is in its deepest position with respect to the dielectric cylinder carried by the bushing whereupon, after reaching the stop position, the piston can be accurately adjusted in the usual manner to some precise value. Thereafter, the complete piston assembly including the piston trimming mechanism can be completely moved to its second stop position where the piston has previously been accurately adjusted to the capacitance value which it must satisfy in the second position.

Accordingly, a primary object of this invention is to provide a novel piston trimmer capacitor which can be moved between two widely removed stop positions and can be accurately trimmed in either of these positions.

Another object of this invention is to provide a novel inexpensive single capacitor structure which serves the purpose of a first and second trimmer capacitor.

These and other objects of this invention will become apparent from the following description when taken in connection with the drawings, in which:

FIGURE 1 shows a perspective view of a first embodiment of the present invention.

FIGURE 2 is a cross-sectional view of the embodiment of FIGURE 1.

FIGURE 3 is a side plan view of FIGURE 2 as seen from the left-hand side of FIGURE 2.

FIGURE 4 is a cross-sectional view of FIGURE 2 taken across the lines 4—4 in FIGURE 2.

FIGURE 5 is a side plan view of a second embodiment of the invention.

FIGURE 6 is a side cross-sectional view of the embodiment of FIGURE 5.

FIGURE 7 is a side plan view of the embodiment of FIGURE 6 as seen from the left-hand side of FIGURE 6.

FIGURE 8 is a cross-sectional view of FIGURE 6 taken across the lines 8—8 in FIGURE 6.

FIGURE 9 is a cross-sectional view of FIGURE 6 taken across the lines 9—9 in FIGURE 6.

FIGURE 10 is a partial exploded perspective view illustrating the connection between the stop ring and adjustment screw of FIGURE 6.

Referring first to FIGURES 1 through 4, we have illustrated therein a trimmer capacitor structure comprised of a typical support bushing 20 which may have a mounting flange 21 and threaded section 22 which receives a mounting nut (not shown). The right-hand end of bushing 20 then receives a suitable dielectric tube 23 in the usual manner as by solder portion 24 (FIGURE 2) which solders a suitable metallized band on the left-hand end of tube 23 to the flange 21. The right-hand end of tube 23 then has a metallized electrode 25 thereon.

The bushing 20 then has a rectangular through-opening 26 therein which receives a square tube 27 which serves as the support for the trimmer piston assembly. More particularly, the square tube 27 has the extending corners thereof threaded as shown by threaded sections 28, 29 and 30 in FIGURE 1, which threads receive a circular (or hexagonal or square) stop nut 31 (which is self-locking), shown in FIGURES 2 and 3. The right-hand end of the support frame member 27 includes a portion 32 which defines a cavity 33 extending into the right-hand end of member 27. The portion 32 is then internally threaded to receive a threaded adjustment screw 34 which has a tool-receiving slot 35 therein.

The extreme right-hand end of member 27 defining the circular cavity 33 is then provided with two extending slots 36 and 37 (FIGURES 2 and 4) which receive the extending ears 38 and 39, respectively, of a threaded spring-retaining nut 40. The screw 34 is threaded through the nut 40 with a torque control spring 41 being captured between the left-hand end of cavity 33 and the left-hand surface of nut 40. The extending ears 38 and 39 of nut 40 prevent rotation of nut 40 as the screw 34 is rotated, but permit the axial movement of nut 40 required to apply a force on screw 34, directed to the right in FIGURE 2, to prevent backlash between screw 34 and the threaded portion 32 and to require a predetermined torque for rotating screw 34. The right-hand end of screw 34 then has a necked-down portion 42 which extends through a central opening in piston 43 and is peened over at portion 44, whereby the piston 43 is directly secured to the end of screw 34.

It will now be apparent that the position of piston 43 can be accurately adjusted with respect to its support frame assembly 27 by rotation of screw 34. The support frame 27 is then arranged to be slidable between two stop positions with respect to bushing 20. Thus, the support frame 27 is provided with a shoulder 50 which is engageable by the right-hand end surface of flange 21 so that the frame 27 can be pulled to the left until shoulder 50 engages the interior portion of flange 21, whereby a first stop position is established. The support frame 27 may be held in this position in any desired manner as by the provision of flat spring 51 secured to bushing 20 through hole 52.

The capacitance value in this first stop position may then be accurately adjusted by rotation of screw 34 in the usual manner until the spacing between piston 43 and electrode 25 are at the desired value. This then establishes a first accurately adjusted value for the device. Thereafter, the support frame assembly 27 is moved to the right and established in a second accurately adjusted position with respect to electrode band 25. The self-locking nut 31 is then threaded down the outer surface of frame 27 to a position immediately adjacent and in contact with the end of bushing 20, thus establishing a second stop position for the device.

The two stop positions for the device may now be at such values that they would accurately tune a receiver to either of two different carrier frequencies. Clearly, the carrier frequency to be received can now be selected by a simple push or pull operation of the frame 27 or the self-locking nut 31. Moreover, where fine tuning is necessary within the pushed position, it is only necessary to adjust the position of nut 31 with regard to frame 27 (in the pulled position, frame 27 always comes back to the same physical point), but fine tuning of screw 34 by slot 35 will vary this pulled value as defined by the motion of piston 43 with respect to electrode 25.

Referring next to FIGURES 5 through 10, we have illustrated therein a second embodiment of the invention which accomplishes the end results of the device of FIGURES 1 through 4 with a less expensive construction.

Referring now to FIGURES 5 through 10, I have illustrated therein a device having a support bushing 60 which carries a dielectric tube 61 in the usual manner.

As illustrated in FIGURE 5, and alternative to the arrangement shown in FIGURES 1 and 2, a central electrode band 62 is metallized on the cylinder 61, and receives a wire lead 63 as by soldering.

The bushing 60 which may have a suitable end flange 64 and external mounting thread 65 is further provided with a threaded opening 66 therethrough. The threaded opening 66 then threadably carries an elongated threaded nut 67 which has a square opening 68 therethrough (FIGURE 8). The square opening 68 then receives a square adjustment screw 69, the corners of which are threaded and receive a self-locking stop nut 70, as shown in FIGURES 5, 6 and 7. The square shaft 69 is slidably movable with respect to nut 67, and is suitably connected to a piston 71 at its right-hand end. A central portion of square shaft 69 has a necked-down region 72 which receives a snap-ring 73 which extends beyond the periphery of square shaft 69.

It will now be apparent that the piston 71 and shaft 69 can be moved between two stop positions. The first position is that position where the ring 73 engages the right-hand end of nut 67, while the second adjustment position is that position where the shaft 69 is moved to the right and the nut 70 engages the left-hand end surface of bushing 60. The exact position of piston 71 at the former of these stop positions may then be accurately controlled by rotation of square screw 69 which, in turn, will rotate nut 67 to alter the position at which ring 73 engages nut 67.

In operation, a first tuning position may be accurately located by moving square shaft 69 to its left-handmost position, and thereafter rotating shaft 69 and nut 67 until the piston 71 is in its accurately adjusted position. Thereafter, the square shaft 69 may be moved to the right with the second adjusted position accurately controlled by the position of nut 70 engaging the left-hand end of bushing 60.

In order to provide a holding force for holding the shaft 69 in position after its adjustment, a leaf spring 80 is rigidly connected to nut 67, and is rotatable therewith and bears against shaft 69. The leaf spring 80 provides sufficient force to press piston 71 against the interior of tube 61 with a sufficient holding force to prevent accidental movement of piston 71.

Although this invention has been described with respect to its preferred embodiments, it should be understood that many variations and modifications will now be obvious to those skilled in the art, and it is preferred, therefore, that the scope of the invention be limited not by the specific disclosure herein, but only by the appended claims.

The embodiments of the invention in which an exclusive privilege or property is claimed are defined as follows:

1. A two-position trimmer capacitor; said two-position trimmer capacitor comprising a support bushing having an opening therethrough, a dielectric cylinder connected to said support bushing and extending coaxially therewith, an electrode band secured to said dielectric cylinder, a conductive piston coaxially positioned in said dielectric cylinder and axially movable within said dielectric cylinder, an elongated support shaft extending through said opening in said support bushing and connected to said piston at one end thereof, and support means connected between said elongated support shaft and the interior of said opening in said support bushing; said support means including an axially extending square portion defining an axially slidable connection between said support bushing and said elongated support shaft; said support means including a threaded portion defining a rotatable threaded connection between said support bushing and said elongated support shaft; first and second stop means for limiting the axial sliding movement of said elongated support shaft between respective first and second spaced positions with respect to said support bushing, said first stop means comprising a nut movable into engagement with said support bushing and threadably adjustable with respect to said elongated adjustment screw, said second stop means being movable into engagement with said support means and being operatively connected to said elongated support shaft; said opening in said support bushing comprising a shaft having a square tubular portion extending through said rectangular opening in said support bushing; said elongated support shaft being a threaded circular shaft; said support means including an internally threaded portion for threadably receiving said elongated support shaft.

2. A two-position trimmer capacitor; said two-position trimmer capacitor comprising a support bushing having an opening therethrough, a dielectric cylinder connected to said support bushing and extending coaxially therewith, an electrode band secured to said dielectric cylinder, a conductive piston coaxially positioned in said dielectric cylinder and axially movable within said dielectric cylinder, an elongated support shaft extending through said opening in said support bushing and connected to said piston at one end thereof, and support means connected between said elongated support shaft and the interior of said opening in said support bushing; said support means including an axially extending square portion defining an axially slidable connection between said support bushing and said elongated support shaft; said support means including a threaded portion defining a rotatable threaded connection between said support bushing and said elongated support shaft; first and second stop means for limiting the axial sliding movement of said elongated support shaft between respective first and second spaced positions with respect to said support bushing, said first stop means comprising a nut movable into engagement with said support bushing and threadably adjustable with respect to said elongated adjustment screw, said second stop means being movable into engagement with said support means and being operatively connected to said elongated support shaft; said opening in said support bushing internally threaded; said support means comprising a circular member having an exterior thread and a square opening therethrough; said elongated support shaft comprising a square shaft extending through said square opening of said circular member; said exterior thread of said circular member being threaded into said threaded opening in said support bushing.

3. The device substantially as set forth in claim 1 which includes first and second stop means for limiting the axial sliding motion of said elongated support shaft between a first and second position; said square tubular portion of said support means shaft having the corners thereof threaded; said first stop means comprising a nut threaded on said square tubular portion and movable into engagement with said support bushing; said second stop means comprising a radially extending portion of said support means movable into engagement with said support bushing.

4. The device substantially as set forth in claim 2 which includes first and second stop means for limiting the axial sliding motion of said elongated support shaft between a first and second position; said first stop means comprising a nut threaded on said elongated support shaft movable into engagement with one side surface of said support bushing; said second stop means including an extending portion of said elongated support shaft movable into engagement with the opposite side surface of said support bushing.

5. The device substantially as set forth in claim 2 which further includes a leaf spring secured to a side surface of said support bushing and extending into sliding engagement with said elongated support shaft.

References Cited by the Examiner

UNITED STATES PATENTS

| | | | |
|---|---|---|---|
| 2,578,608 | 12/1951 | Shull | 336—136 X |
| 2,984,776 | 5/1961 | Barnes | 317—249 |
| 3,051,879 | 9/1962 | Lazar | 317—249 |

LEWIS H. MYERS, *Primary Examiner.*

ROBERT K. SCHAEFER, *Examiner.*

E. GOLDBERG, *Assistant Examiner.*